United States Patent

[11] 3,550,519

| [72] | Inventor | Edward H. Lewis |
| | | 9497 Foster Road, Downey, Calif. 90242 |
| [21] | Appl. No. | 742,645 |
| [22] | Filed | July 5, 1968 |
| [45] | Patented | Dec. 29, 1970 |

[54] MULTIPLE-LIGHT BAR FOR PORTABLE CAMERA
3 Claims, 6 Drawing Figs.

| [52] | U.S. Cl. | 95/86, 240/1.3, 240/2 |
| [51] | Int. Cl. | G03b 17/56 |
| [50] | Field of Search | 95/86; 240/1.3, 2C |

[56] References Cited
UNITED STATES PATENTS

| 2,531,254 | 11/1950 | Caroselli et al. | 240/1.3X |
| 2,599,269 | 6/1952 | Markle | 95/86 |
| 3,258,585 | 6/1966 | Crete | 95/86X |
| 3,289,563 | 12/1966 | Kent | 95/86 |

*Primary Examiner*—John M. Horan
*Assistant Examiner*—Kenneth C. Hutchison
*Attorney*—Harris, Kiech, Russell and Kern ABSTRACT: A support for mounting a portable camera includes a light support carrying two lamps. The upper lamp, located at a variable height above the camera lens, tilts downward toward the lens axis at an adjustable angle. The lower light is aimed inward at an angle toward the lens axis, allowing the two lamps to be focused at a common point. A pivot between the lamp support and camera support permits rotating the camera to either the horizontal or vertical position.

PATENTED DEC 29 1970
3,550,519
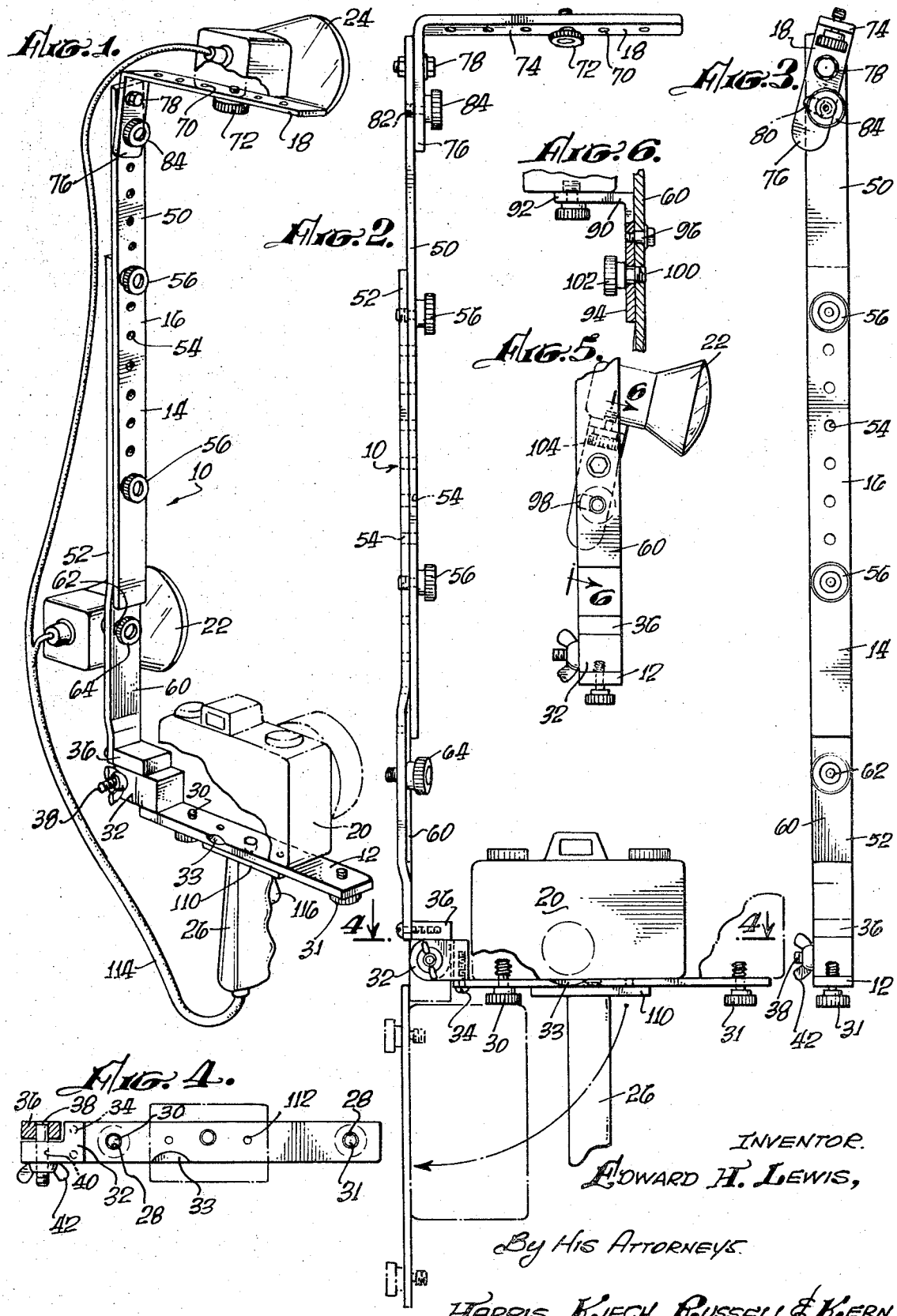
INVENTOR.
Edward H. Lewis,
By His Attorneys
Harris, Kiech, Russell & Kern.

MULTIPLE-LIGHT BAR FOR PORTABLE CAMERA

THE DISCLOSURE

This invention relates to a multiple light bar for a portable camera and more particularly to a light bar which provides directional mountings for a plurality of lamps and support for the portable camera. The device is of particular use with portable still-picture cameras.

An important aspect in the picture-taking art is the proper lighting for the subject matter, particularly where the picture is to be taken indoors or is an outdoor closeup. Proper lighting of the subject matter is achieved by the positioning of lights or lamps relative to the subject and to the camera such that the lamps are directed toward and focus on a particular point or points in relation to the subject.

Proper lighting presents no problem when pictures are taken in a studio where all the necessary lighting equipment is at hand. However, when a photographer is taking candid shots, as at parties and dances, it is impractical if not impossible to carry the sophisticated studio lighting equipment with him. On such assignments the photographer may employ a hand held lamp or flash or in some instances a light bar connected to the camera. Unfortunately, the lighting provided by such devices is far from adequate and the quality of the pictures is below that of the shots taken at the studio.

In some instances multiple-light bars have been employed although their use to date has been restricted almost exclusively to motion picture cameras. Several multiple-light bars have been developed, however, which are capable of use with still-picture cameras. Unfortunately, the design of such multiple-light bars has heretofore not resulted in any substantial improvement of the lighting for candid pictures. In fact, about all that can be said for such bars is that they provide more light than that provided by single-light bars and flash attachments.

The multiple-light bars previously employed do not provide the directional focusing of light necessary for the production of improved quality candid pictures. Moreover, they do not provide for adjustment of the directional focusing of light therefrom which is necessary when taking candid pictures from different positions and from different distances. Examples of such conventional multiple-light bars are bars including a series of lights or lamps in a horizontal row below the lens of the camera.

Accordingly, I have developed a novel multiple-light support device which permits lighting of the subject from various positions with respect to the camera and to the subject itself. The light bar is easily and inexpensively manufactured and is constructed from a lightweight material.

More particularly, my device includes a camera support member connected to a light support member including a vertical portion attached to the camera support and an end portion attached remote from the camera and perpendicular to the vertical portion. The vertical portion may include a skewed intermediate portion directed inwardly, to which a lamp may be mounted for direction toward a point in front of and in the field of sight of the camera, or may include a pivotal mount for a lamp permitting directional adjustment of the lamp. The end portion includes means for mounting a lamp vertically displaced from the camera and preferably on the vertical axis of the camera lens. The lamp on the end portion preferably is also directionally adjustable so that all the lamps can be directed toward various common points in the field of sight of the camera. In the preferred embodiment, the camera support member is pivotally connected to the light support member enabling a camera mounted thereon to be held both horizontally and vertically.

It is an object of my invention, therefore, to provide a multiple lamp support for a portable camera which is easily and inexpensively manufactured and relatively lightweight.

Another object of my invention is to provide a multiple-light support for a portable camera which includes a camera support member attached to a lamp support member. A further object is to provide such a device wherein these members are pivotally attached together.

Another object of my invention is to provide a multiple-light support wherein lamps may be directionally mounted for focusing on a point in front of and in the field of sight of the camera. Still another object is to provide such a device wherein the focusing point or points of the lamps may be adjustably varied.

Another object of my invention is to provide a multiple-light support wherein a lamp is mounted vertically remote from the camera on the vertical axis of the camera lens.

The invention, both as to its organization and method of operation, together with further objects and advantages thereof, may best be understood by reference to the following description taken in connection with the accompanying drawing.

In the drawing:

FIG. 1 is an isometric view of my multiple lamp bar with a typical camera and lamps mounted thereon;

FIG. 2 is a rear elevational view of my device of FIG. 1 with the lamps removed;

FIG. 3 is a side elevational view of my lamp support;

FIG. 4 is a horizontal sectional view of my invention taken along the line 4—4 in FIG. 2;

FIG. 5 is a fragmentary side elevational view of the vertical portion of my lamp support showing another embodiment of my invention; and FIG. 6 is a fragmentary sectional view taken along the line 6—6 in FIG. 5.

Referring now to the drawing, my multiple lamp bar, indicated generally by the reference numeral 10, may be fabricated from a light rigid metal such as aluminum and includes a camera support member 12 connected to a lamp support member 14. The lamp support member 14 includes a vertical portion 16 connected at one end to the camera support member 12 and an end portion 18 remote from the camera support member 12 and connected, preferably perpendicularly, to the vertical portion 16. The lamp support member may be formed from one piece with the end portion 18 being bent perpendicularly to the vertical portion 16; however, preferably, the end portion 18 is pivotally connected to the vertical portion 16.

A typical portable camera 20, for example, a 35 millimeter camera, is mounted on the camera support member 12 and lamps 22 and 24 may be mounted on the lamp support member 14. The lamps 22 and 24 preferably are mounted for directional alignment for focusing at a point or points in the field of sight of the camera as will be more fully described later. In the preferred embodiment, the camera support member 12 is pivotally connected to the lamp support member 14 and may pivot between a first horizontal position generally perpendicular to the vertical portion 16 and a second vertical position, as indicated by dash lines in FIG. 2, generally parallel to the vertical portion 16. A hand grip 26 may be attached to the camera support member 12 for holding the entire apparatus by one hand.

More particularly, and in the illustrated form of my invention, the camera support member 12 includes threaded openings 28 (FIGS. 2 and 4) to receive lock screws 30 and 31 to mount the camera 20 to the camera support 12. For example, with a 35 millimeter camera, as illustrated in FIG. 2, the inner lock screw 30 would be used to mount the camera. Where, however, a larger camera would be employed, the outer lock screw 31 would be utilized with the other threaded hole 28, as indicated by the dash lines in FIG. 2. A slot or groove 33 may be cut or stamped in the support member 12 to permit viewing of the number of exposures remaining on the film.

The camera support member 12 preferably is pivotally connected to the light support member 14 at the lower end of vertical portion 16. For example, a hinge-type connection may be provided wherein a rounded L-shaped member 32 may be suitably attached to the camera support member 12 as by screws 34 and adapted to ride adjacent a similarly L-shaped member 36 suitably attached to the vertical portion 16. A shank 38 (FIG. 4) embedded in the member 36 extends through an opening 40 in the member 32 and provides the pivotal hinge support for the camera member 12. The shank 38 is screw-threaded at its outward end to receive a wing nut 42 to lock the camera support member 12 in its desired position.

As illustrated by FIG. 2, the camera support member 12 may be positioned horizontally, perpendicular to the vertical portion 16, or may be pivoted downwardly, as indicated, to a second vertical position generally parallel to the vertical portion 16. The camera 20, therefore, may be mounted normally horizontally or in a vertical position when the camera support member 12 is swung to its second and vertical position. This allows either greater horizontal or vertical picture dimensions when a typical still-picture camera is used which produces elongated rectangular photographs. For example, the 35 millimeter camera in its normal position will produce a picture having a greater width than height. When the camera is in its vertical position, the picture produced will be greater in height than width.

The vertical portion 16 preferably may be telescoped to extend or reduce the distance the end portion 18 is displaced from the camera 20 and the camera support member 12. For example, the vertical portion 16 may include two slidably adjacent members 50 and 52 which may each be suitably drilled with a series of threaded openings 54 to receive locking screws 56. By removing the locking screws 56 and sliding the member 50 relative to the member 52, the vertical portion 16 may be varied in length and when the desired length is attained, the locking screws 56 may be reinserted to lock the vertical portion in this desired length.

The lamp 22 preferably is mounted to the vertical portion 16 for directional alignment with a focusing point in front of and remote from the camera 20. For example, an intermediate skewed portion 60 may be provided in the vertical portion 16, preferably in the member 52 adjacent the camera support member 12. The skewed portion 60 may be bent or stamped to slant inwardly toward the field of sight of the camera 20. A threaded hole 62 is provided in the skewed portion 60 to receive a lock screw 64 to mount the lamp 22 for direction inwardly toward the point in front of and remote from the camera 20 in the field of sight. The skewed portion 60 may be preformed at any desired angle to direct the lamp 22 at the preferred angle to focus at an advantageous point remote from the camera 20. If the lock screw 64 is loosened, the direction of the lamp 22 may be adjusted vertically and when the desired vertical direction is achieved, the lock screw 64 may be tightened to hold the lamp 22 in this position.

In another embodiment of the invention as shown in FIGS. 5 and 6, the lamp 22 is mounted to a pivotable horizontal support mounted to the vertical portion 16 of the lamp support 14. For example, as indicated in FIG. 6, the pivotable support may be mounted to the skewed portion 60; however, it is not necessary in this embodiment that the vertical portion 16 include the skewed portion 60. An L-shaped member or mount 90 includes a horizontal portion 92 for mounting the lamp 22 and a vertical portion 94 pivotally mounted adjacent the skewed portion 60. The vertical portion 94 is bolted at 96 to the skewed portion 60 and includes a slot 98 adjacent a threaded hole 100 in the skewed portion 60 for receiving a lock screw 102. By loosening the screw 102, the member 90 can be tilted vertically (FIG. 5) to adjust the vertical angle of the lamp 22 to focus the lamp at a desired point in front of the camera 20. The lamp 22 is mounted to the member 90 by a lock screw 104 and can be adjusted horizontally as well to focus on any point in the field of sight of the camera 20.

The end lamp support portion 18 is bent from or attached to the vertical portion 16 remote from the camera support member 12. Preferably, the end portion 18 extends generally in a horizontal plane perpendicular to the vertical portion 16 and above the camera 20. The end portion 18 includes threaded holes 70 to receive a lock screw 72 to mount the lamp 24 thereto. The holes 70 preferably are spaced above the camera support 12 to position the lamp 24 directly above the lens of the camera 20, on the vertical axis of the lens, whether the camera support member 12 is in its first horizontal position or in its second vertical position. By positioning the lamp 24 directly above the camera lens, the maximum lighting effect for the subject in relation to the camera may be achieved.

In the preferred embodiment, the end portion 18 is pivotally attached to the vertical portion 16 permitting the end portion 18 to be tilted about its longitudinal horizontal axis to adjustably direct the lamp 24 downwardly toward a preferred point in front of and remote from the camera 20 and in its field of sight. For example, the end portion 18 may include a horizontal portion 74 and a bent portion 76 generally perpendicular thereto. The bent portion 76 is adapted to be mounted, for example, adjacent the member 50 of the vertical portion 16. The bent portion 76 may be bolted to the member 50 at 78 to provide the pivotal axis of the end portion 18 and may include a slot 80 adjacent a threaded opening 82 in the member 50 to receive a lock screw 84. When the end portion 18 is tilted (FIG. 3), the slot 80 slides adjacent the shank of the lock screw 84 and when the desired amount of vertical inflection of the end portion 18 is provided, the lock screw 84 is tightened to lock the bent portion 76 to the member 50. By loosening the lock screw 72, the direction of the lamp 24 may be adjusted horizontally as well. If desired, therefore, the lamp 24 and the lamp 22 may be directed toward a common point in front of and remote from the camera 20 where the directional axes of the lamps intersect, or, the lamps may be adjustably directed toward different focusing points remote from the camera 20. It can be seen, therefore, that the lamps 22 and 24 can be easily synchronized to give the desired lighting to the subject to be photographed.

The entire device may be held and supported by one hand and for this purpose the hand or pistol grip 26 is attached to the camera support member 12. The pistol grip 26 may be mounted to a base member 110 which may be attached beneath the camera support member 12 as by rivets or screws 112. Preferably, the pistol grip 26 is electrically connected to the lamps 22 and 24 as by a lead 114. A button switch 116 may be provided on the pistol grip 26 to actuate the lamps 22 and 24. The lamps are suitably connected to an electrical power source (not shown). The button switch 116 may also be connected to the shutter lever of the camera 20 permitting the actuation of the camera with the simultaneous actuation of the lamps 22 and 24.

It can be seen, therefore, that my multiple lamp bar provides a support for a portable camera and for lamps which may be coordinated and directed toward a common point remote from and in front of the camera where the directional axes of the lamps intersect. Moreover, the lamps may be adjustably directed to different focusing points remote from the camera in its field of sight. The lamp mounted to the vertical portion 16 may be directed at an angle inwardly toward the field of sight of the camera while the lamp on the end portion 18 preferably is mounted vertically above the lens of the camera 20 and may be adjusted vertically and horizontally to focus on a point in the field of sight of the camera. Proper and optimum lighting of the subject may be achieved particularly with candid shots where the location of the subject and the directional sighting of the camera may be varied. The camera support 12 is pivotable between a first horizontal position and a second vertical position permitting both horizontal and vertical mountings for the camera. A pistol grip is provided, enabling the device to be held by one hand and a button switch on the grip can be utilized to simultaneously actuate the camera and the lamps.

Although the vertical portion 16 is shown on the left side of the camera and the end support portion 18 is shown vertically above the camera, it is to be understood that the vertical portion may be provided on either side and the end portion may be provided either above or below the camera and these and other similar uses are intended to be within the scope of the invention.

Although I have described in some detail exemplary embodiments of my invention, changes, modifications, and substitutions may be made therein without departing from the spirit of the invention. I therefore intend that my invention be limited in scope only by the terms of the following claims.

I claim:

1. A manually portable multiple lamp bar for use with a portable camera, including:
    a camera support member adapted to mount the camera;
    an elongated lamp support member attached at one end to said camera support member and including an elongated vertical portion and an elongated end portion remote from said camera support member and extending outwardly from said vertical portion, said vertical portion further including a skewed intermediate portion bent at an angle inwardly toward the field of sight of the camera;
    means on said end portion for mounting a first lamp thereon vertically spaced from the camera; and
    means on said skewed intermediate portion for mounting a second lamp thereon at one side of the camera.

2. A manually portable multiple lamp bar for use with a portable camera and for mounting lamps electrically connected to a power source, including:
    a camera support member adapted to mount the camera;
    an elongated lamp support member including an elongated vertical portion pivotally connected at one end to said camera support member and an elongated end portion pivotally attached to the other end of said vertical portion for mounting a lamp vertically spaced from said camera, said camera support member being adapted to adjustably rotate between a first horizontal position substantially perpendicular to said vertical portion and a second vertical position substantially parallel with said vertical portion, said end portion extending laterally from said vertical portion substantially parallel to said camera support member when in its said first horizontal position, said end portion being tiltable about its horizontal longitudinal axis, said vertical portion including a skewed intermediate portion bent at an angle inwardly toward the field of sight of the camera and adapted to mount a second lamp directed toward a point remote from and in front of the camera lens;
    means on said end portion for adjustably mounting the vertically spaced lamp on a vertically extending axis of the camera lens for variable direction toward the field of sight of the camera; and
    means on said skewed portion for adjustably mounting said second lamp for variable direction toward the field of sight of the camera.

3. A multiple lamp bar as defined in claim 2 including means for varying the length of said vertical portion.